United States Patent
Bhattacharya

(10) Patent No.: US 7,401,199 B2
(45) Date of Patent: Jul. 15, 2008

(54) METHOD AND SYSTEM FOR ALLOCATING MEMORY TO AN ELECTRONIC DEVICE

(75) Inventor: Abhijit Bhattacharya, Chicago, IL (US)

(73) Assignee: Motorola, Inc, Schaumburg, IL (US)

(*) Notice: Subject to any disclaimer, the term of this patent is extended or adjusted under 35 U.S.C. 154(b) by 230 days.

(21) Appl. No.: 11/427,059

(22) Filed: Jun. 28, 2006

(65) Prior Publication Data

US 2008/0040568 A1    Feb. 14, 2008

(51) Int. Cl.
*G06F 12/06* (2006.01)
(52) U.S. Cl. ............................ 711/170
(58) Field of Classification Search ............ 711/170, 711/171; 705/8; 700/99
See application file for complete search history.

(56) References Cited

U.S. PATENT DOCUMENTS 6,032,123 A * 2/2000 Jameson ................... 705/8

2005/0015207 A1 * 1/2005 Prasad ...................... 702/19

FOREIGN PATENT DOCUMENTS

EP    0 456 275 A2 * 11/1991

OTHER PUBLICATIONS

Pocock, M. et al., "Biojava: Open Source Component for Bioinformatics", ACM Sigbio Newsletter, 2000, pp. 10-12.*
Ramu, C. et al., "Object-oriented parsing of Biological Databases with Pyton," Bioinformatics, 2000, pp. 628-638.*

* cited by examiner

*Primary Examiner*—Pierre-Michel Bataille
(74) *Attorney, Agent, or Firm*—Hisashi D. Watanabe

(57) ABSTRACT

A method and system for allocating memory to an electronic device (202) is provided. The method includes providing (404) a first static memory allocation to each allocation request of a first plurality of allocation requests. The method also includes determining (406) a mean and a standard deviation from the first plurality of allocation requests. Further, the method includes providing (408) a second static memory allocation to each allocation request of a second plurality of allocation requests, wherein the second static memory allocation is based on at least two standard deviations greater than the mean.

12 Claims, 4 Drawing Sheets

METHOD AND SYSTEM FOR ALLOCATING MEMORY TO AN ELECTRONIC DEVICE

This invention generally relates to electronic devices, and more specifically, to a method and system for allocating memory to an electronic device.

BACKGROUND OF THE INVENTION

In recent years, there has been an increase in the use of electronic devices such as mobile phones, laptops. Personal Digital Assistants (PDAs), Automatic Teller Machines (ATMs), microwave ovens. Programmable Logic Controllers (PLCs), pagers, oscilloscopes, routers, and wired phones. These electronic devices have a recording medium or a storage space, referred to as memory, to store information that can be used in the future. Examples of the memory include, but are not limited to, Random Access Memory (RAM), Read Only Memory (ROM), and cache memory. One or more applications can be implemented on the electronic device to perform various functions. Examples of the one or more applications include Bluetooth, infrared, a camera, a voice recorder, and a calculator.

Typically, an electronic device allocates a predefined amount of memory to an application at the start-up stage of the electronic device. Such a memory allocation is referred to as a static memory allocation. The statically allocated memory is divided into one or more memory pools. Each of the one or more memory pools is further divided into one or more fixed-size blocks. A memory allocator, which is part of a computer program, accepts requests for memory allocation from the one or more applications present at the electronic device. The memory allocator allocates fixed-size memory blocks to the one or more applications on a need basis. The fixed-size memory block can be greater than or equal to the requested size of the memory requested by the one or more applications. Further, the memory allocator marks such a fixed-size memory block as in-use. A fixed-size block for an application, if marked in-use by the memory allocator, cannot be re-allocated to any other application till the time it is used by the application.

The number and size of the memory requests from an application depends on the protocol that is being used. In static memory allocation, memory is allocated to the application at the start-up of the electronic device, and therefore, remains unchanged until the electronic device is restarted. Typically, the one or more memory pools and the one or more fixed-size memory blocks are allocated such that none of the applications of the one or more applications runs short of memory. For example, the memory allocator of the electronic device allocates a fixed-size (1500 bytes) memory block for a web browser application using the Transmission Control Protocol/Internet Protocol (TCP/IP) protocol. However, the web browser may not use all the memory that is allocated to it which results in memory wastage. Further, when there is a change in the application requesting fixed-size memory blocks from the electronic device, the fixed-size memory block that was assigned at the start-up of the electronic device is allocated to the new application. For example, when the application changes from a web browser application using TCP/IP (packet size 1500 bytes) to a Voice over Internet Protocol (VoIP) application using Real-Time Transport Protocol/User Datagram Protocol/Internet protocol (RTP/UDP/IP), which requires only a 66-byte packet size for G.723.1 and a 200-byte total for a G.729a codec, the allocated memory is not utilized fully, since the VoIP application requires a fixed-size block of 66 bytes only, as compared to the 1500-byte packet size allocated to it.

Hence, there is a need for a method that enables efficient use of memory while allocating fixed-size memory blocks to the allocation requests of the one or more applications present at the electronic device.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
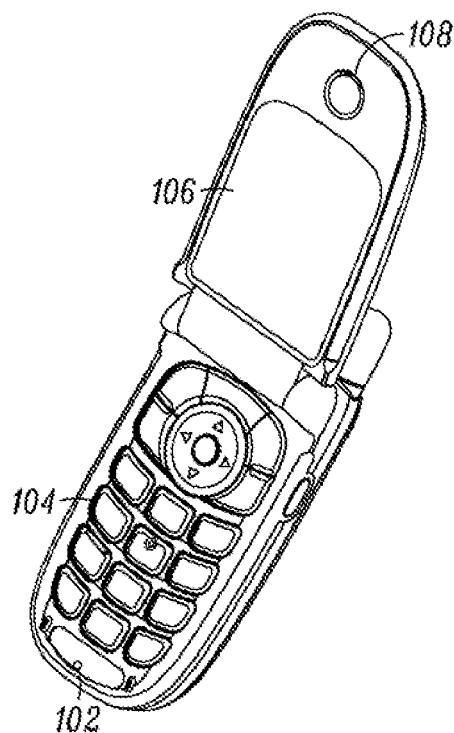
FIG. 1 is an exemplary electronic device, where various embodiments can be practiced in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of embodiments of the present invention.

DETAILED DESCRIPTION

Before describing in detail the particular method and system for allocating memory to an electronic device, in accordance with the present invention, it should be observed that the present invention resides primarily in combinations of method steps related to allocating memory to an electronic device. Accordingly, the apparatus components and method steps have been represented, where appropriate, by conventional symbols in the drawings, showing only those specific details that are pertinent for understanding the present invention, so as not to obscure the disclosure with details that will be readily apparent to those with ordinary skill in the art, having the benefit of the description herein.

In this document, the terms "comprises," "comprising," or any other variation thereof, are intended to cover anon-exclusive inclusion, such that a process, method, article or apparatus that comprises a list of elements does not include only those elements but may include other elements not expressly listed or inherent to such a process, method, article or apparatus. An element proceeded by "comprises . . . a" does not, without more constraints, preclude the existence of additional identical elements in the process, method, article or apparatus that comprises the element.

A "set" as used in this document, means a non-empty set, i.e., comprising at least one member. The term "another," as used in this document, is defined as at least a second or more. The terms "includes" and/or "having", as used herein, are defined as comprising.

A method for allocating memory to an electronic device is disclosed, in accordance with an embodiment of the present invention. The method includes providing a first static memory allocation to each allocation request of a first plurality of allocation requests. The method also includes determining a mean and a standard deviation from the first plurality of allocation requests. Moreover, the method includes providing a second static memory allocation to each allocation request of a second plurality of allocation requests. The second static memory allocation is based on at least two standard deviations greater than the mean.

A method for allocating memory to an electronic device is provided, in accordance with another embodiment of the present invention. The method includes providing a first static memory allocation to each allocation request of a first plurality of allocation requests. The method also includes determining a mean and a standard deviation from the first plurality of allocation requests. Moreover, the method includes providing a second static memory allocation to each allocation request of a second plurality of allocation requests, when the mean is at least one standard deviation greater than the first static memory allocation. The second static memory allocation is based on at least two standard deviations greater than the mean.

An electronic device is provided, in accordance with various embodiments of the present invention. The electronic device includes a memory module and a processor. The memory module provides a first static memory allocation to each allocation request of a first plurality of allocation requests. The processor determines a mean and a standard deviation from the first plurality of allocation requests. Further, the processor provides a second static memory allocation to each allocation request of a second plurality of allocation requests, based on at least two standard deviations greater than the mean.

FIG. 1 is an exemplary electronic device 100, where various embodiments can be practiced, in accordance with the present invention. Examples of an electronic device can be a mobile phone, a laptop, a Personal Digital Assistant (PDA), an Automatic Teller Machine (ATM), a microwave oven, a Programmable Logic Controller (PLC), a pager, a oscilloscope, a router, and a wired phone. The electronic device 100 includes a microphone 102, a keypad 104, a display 106, and a speaker 108. The microphone 102 is an acoustic-to-electric transducer that converts a sound signal into an electrical signal. The microphone 102 can be used in applications such as telephones, tape recorders and hearing aids; in radio and television broadcasting; in computers for recording voice; and in VoIP. The speaker 108 can reproduce speech or music. The microphone 102 and speaker 108 of the electronic device 100 can be used by a user of the electronic device 100 to interact with users of other electronic devices. The display 106 of the electronic device 100 is used to present information and data stored in the electronic device 100 in a visual form. The keypad 104 can be used by the user of the electronic device 100 to input information and data into the electronic device 100. A physical memory is another component present at the electronic device 100 (not shown in the FIG. 1). The physical memory refers to a recording medium or a storage space that can retain data and information for a predefined period of time. Examples of the physical memory can be a Random Access Memory (RAM), a Read Only Memory (ROM), a cache memory, etc.

One or more applications may be present at the electronic device 100. Examples of the one or more applications present at the electronic device 100 can be Bluetooth, a voice recorder, a calendar, an infrared, a camera, a calculator, and the like. The physical memory of the electronic device 100 provides storage space for storing the one or more applications present at the electronic device 100. Whenever an application requires memory, the application makes a request for a fixed-size memory block from the physical memory of the electronic device 100. A memory allocator is a part of a computer program, which accepts the memory request from an application to allocate and de-allocate fixed-size memory blocks to the application. Further, the memory allocator can allocate a fixed-size block to the application, which is making a request for the memory. The fixed-size memory block that is allocated to the application, which is making the request can be greater than or equal to the memory requested by the application. Further, the memory allocator marks the fixed-size memory block as in use. The fixed-size memory blocks that are allocated to the application by the memory allocator should be recycled when they are no longer required by the application.

Figure 2:
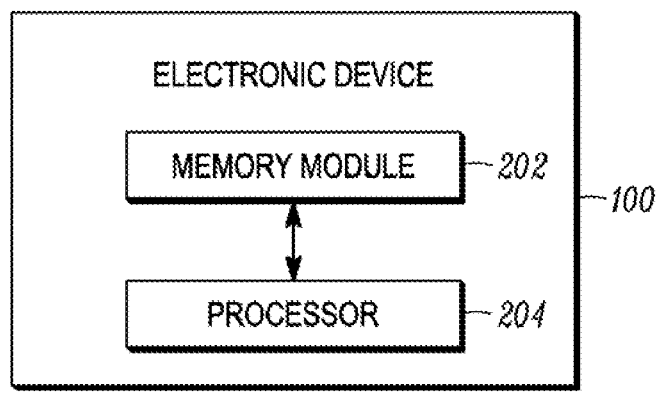
FIG. 2 is a block diagram of an electronic device, in accordance with some embodiments of the present invention.

FIG. 2 is a block diagram of the electronic device 100, in accordance with some embodiments of the present invention. The electronic device 100 includes a memory module 202 and a processor 204. The memory module 202 can be used to store information. The memory module 202 can be a storage medium, which can be attached internally or externally to the electronic device 100. Examples of the memory module 202 can be a Random Access Memory (RAM), a Read Only Memory (ROM), and a cache memory. Typically, the electronic device 100 allocates memory to the one or more applications at the start-up of the electronic device 100. Such memory allocation is referred to as static memory allocation. The memory module 202 can provide a first static memory allocation to each allocation request of a first plurality of allocation requests.

The processor 204 of the electronic device 100 is capable of performing various computations. These computations can be arithmetic, algebraic or any other type of computation. Further, the processor 204 is capable of providing a second static memory allocation to each allocation request of a second plurality of allocation requests. The processor 204 of the electronic device 100 can keep an account of the memory being allocated to the one or more applications stored at the electronic device 100. Further, the processor 204 of the electronic device 100 is capable of computing a mean and a standard deviation from the memory allocated to the one or more applications. The processor 204 can provide the second static memory allocation, based on the computed mean and standard deviation from the memory allocated to the one or more applications. For an embodiment of the present invention, the processor 204 allocates the second static memory allocation when the mean of the sizes of the first plurality of memory allocations is greater than at least one standard deviation of the memory allocated. The size of the second static memory allocation, provided by the processor 204, is at least two standard deviations greater than the computed mean. For another embodiment of the present invention, the second static memory allocation can be based on a Gaussian distribution of memory allocation.

Figure 3:
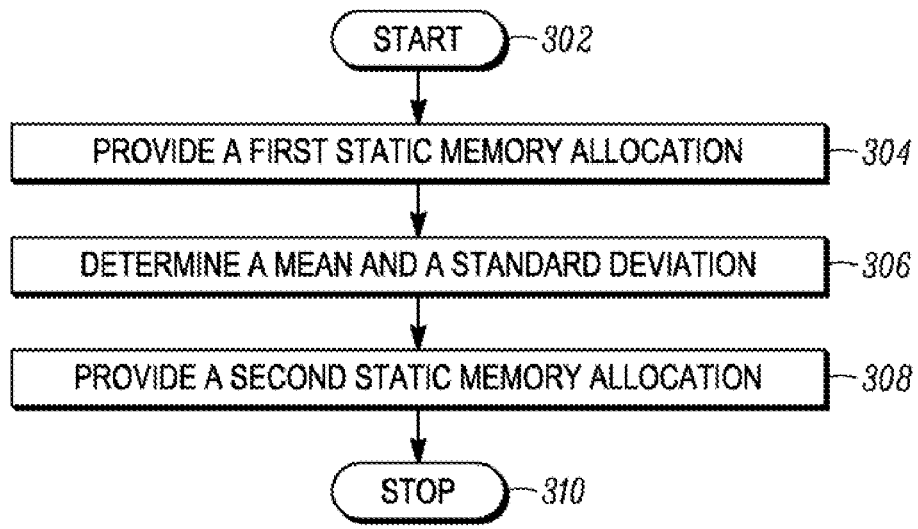
FIG. 3 is a flow diagram illustrating a method for allocating memory to au electronic device, in accordance with various embodiments of the present invention.

FIG. 3 is a (low diagram illustrating a method for allocating memory to the electronic device 100, in accordance with various embodiments of the present invention. The method is initiated at step 302. At step 304, a first memory allocation is provided to each allocation request of a first plurality of allocation requests. For example, for a web browser application using TCP/IP, the first plurality of allocation requests can be allocated a first static memory allocation of 1500 bytes each. Thereafter, the first static memory allocation for the first plurality of allocation requests is sampled. For an embodiment of the present invention, the first static memory allocation can be sampled by the processor 204 of the electronic device 100. For another embodiment of the present invention, the first plurality of allocation requests can be based on a Gaussian distribution of memory allocation.

At step 306, a mean and a standard deviation of the first static memory allocation are computed from the sampled first plurality of memory allocation requests. For an embodiment of the present invention, the mean and the standard deviation can be calculated by the processor 204 of the electronic device 100. At step 308, a second memory allocation is provided to each allocation request of a second plurality of allocation requests. The second static memory allocation is accomplished by allocating fixed-size blocks of a size that is twice the computed standard deviation greater than the mean. For an embodiment of the present invention, the second memory allocation is provided to each allocation request of the second plurality of allocation requests, when the mean of the first static memory allocation is one standard deviation more than the first static memory allocation. For another embodiment of the present invention, the second static memory allocation can be based on a Gaussian distribution of the memory allocation.

For another embodiment of the present invention, sampling of a plurality of static memory allocation requests may start after a predefined number of allocation requests are received by the memory allocator. For example, sampling of a plurality of static memory allocation requests may start after a thousand allocation requests. Further, new memory allocation can be made when the mean of the sampled plurality of memory allocation requests is one standard deviation, as calculated from the sampled plurality of allocation requests greater than the previous mean. The memory allocation size of the new memory allocation is two standard deviations greater than the mean. Thereafter, the method terminates at step 310.

Figure 4:
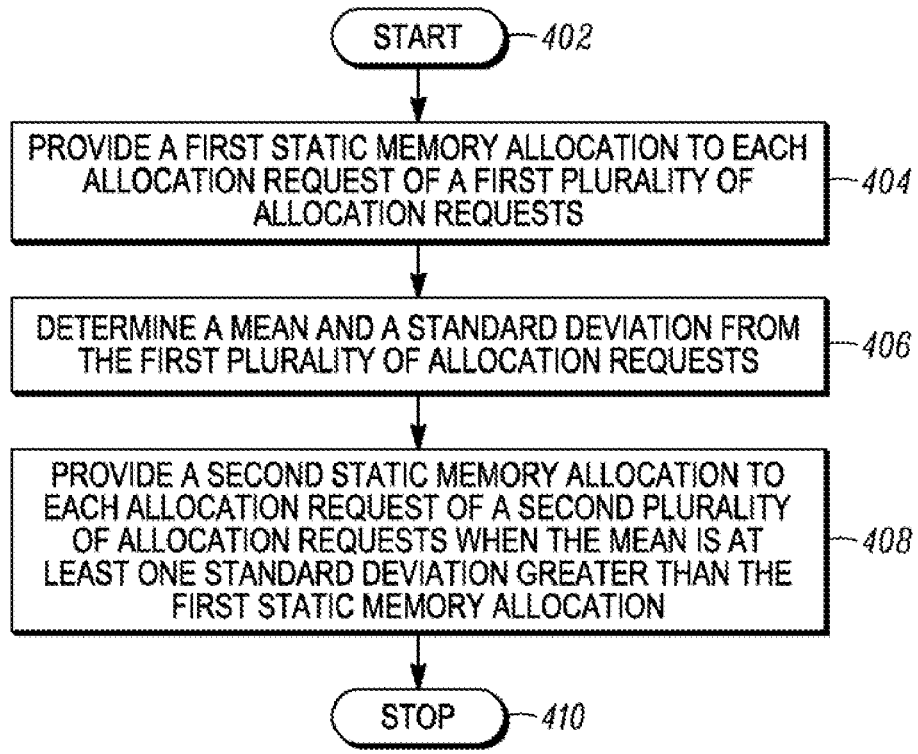
FIG. 4 is a flow diagram illustrating a method for allocating memory to an electronic device, in accordance with an embodiment of the present invention.

FIG. 4 is a flow diagram illustrating a method for allocating memory to the electronic device 100, in accordance with an embodiment of the present invention. The method is initiated at step 402. At step 404, the memory allocator provides a first memory allocation to each allocation request of a first plurality of allocation requests. The first memory allocation of the first plurality of allocation requests is then sampled. For an embodiment of the present invention, the first plurality of allocation requests is based on a Gaussian distribution of memory allocation.

At step 406, a mean and a standard deviation from the sampled first plurality of allocation requests is determined. For an embodiment of the present invention, the processor 204 of the electronic device 100 computes the mean and the standard deviation from the first plurality of memory allocation. At step 408, the electronic device 100 provides a second memory allocation to each allocation request of a second plurality of allocation requests when the mean of the first plurality of memory allocation is one standard deviation more than the first static memory allocation. The second static memory allocation is accomplished by allocating fixed-size blocks of a size that is twice the standard deviation greater than the previous mean.

For an embodiment of the present invention, the sampling of static memory allocation may start after a predefined number of allocation requests are received by the memory allocator. For example, sampling of the plurality of static memory allocation requests may start after a 1000 allocation requests.

Further, new memory allocations can be made when the mean of the sampled plurality of memory allocation requests is more than the previous mean by a value that is equal to one standard deviation of the sampled first plurality of allocation requests. The memory allocation size of the new memory allocation is twice the computed standard deviation greater than the mean of the sampled plurality of memory allocation. Thereafter, the method terminates at step 410.

Figure 5:
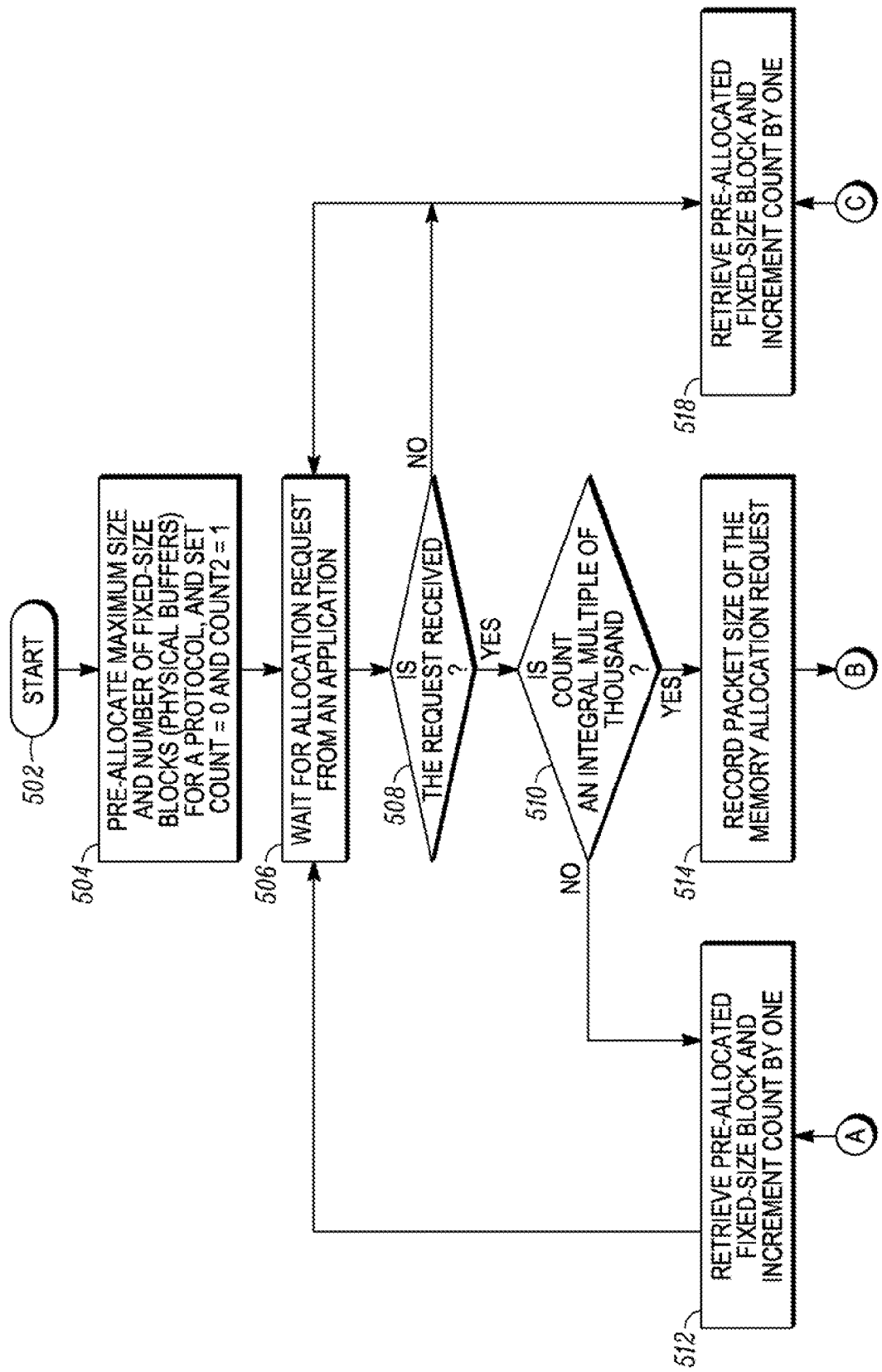
FIGS. 5 and 6 represent a flow diagram illustrating a method for allocating memory to an electronic device, in accordance with another embodiment of the present invention.
Figure 6:
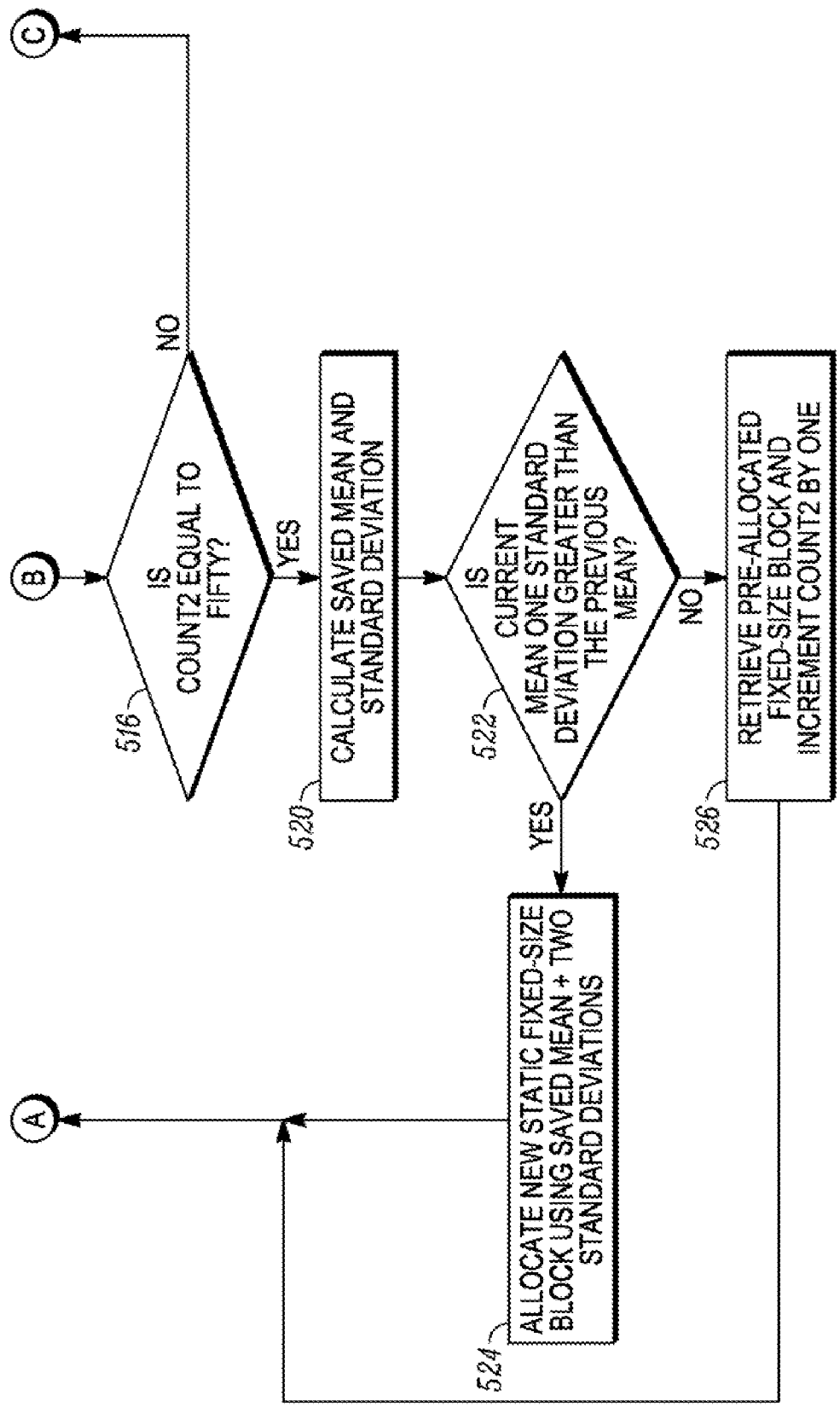

FIGS. 5 and 6 is a flow diagram illustrating a method for allocating memory to an electronic device, in accordance with another embodiment of the present invention. The method starts at step 502. At step 504, the electronic device 100 pre-allocates a fixed-size memory block and a number of fixed-size memory blocks for a protocol. For example, for a web browser application using TCP/IP protocol, the electronic device 100 pre-allocates a maximum size (1500 bytes) for each of the fixed-sized memory blocks. Further, there are two variables, count 1 and count 2, for monitoring the memory allocations to the one or more applications. The value of count 1 and count 2 is initially set as zero and one, respectively. Count 1 monitors the memory allocation requests received by the electronic device 100. The value of count 2 is incremented by one each time the value of the number of the memory allocation requests received by electronic device 100 becomes an integral multiple of 1000. At step 506, the electronic device 100 waits to receive a memory allocation request from the one or more applications stored at the electronic device 100.

At step 508, the electronic device 100 verifies whether a memory allocation request from an application of the one or more applications stored at the electronic device 100 has been received. If the electronic device 100 has not received a memory allocation request from the application, the electronic device 100 waits to receive a memory allocation request from the one or more applications present at the electronic device 100. When the memory allocation request is received from an application of the one or more applications, the electronic device 100 verifies whether the value of count 1 is an integral multiple of 1000 at step 510. If the value of count 1 is not an integral multiple of 1000, the electronic device 100 retrieves the pre-allocated fixed-size blocks at step 512. Simultaneously, the value of count 1 is incremented by one, and subsequently, the electronic device 100 waits for a memory allocation request from the one or more applications present at the electronic device 100. If the value of count 1 is an integral multiple of 1000, the electronic device 100 records the packet size requested by the application at step 514. At step 516, the electronic device 100 verifies whether the value of the count 2 is equal to 50. If the value of count 2 is not equal to 50, the electronic device 100 retrieves the fixed-size memory block and simultaneously increments the value of count 1 by one at step 518. Thereafter, the electronic device 100 waits for a memory allocation request from the one or more applications present at the electronic device 100.

If the value of count 2 is equal to 50, the electronic device 100 computes and stores the mean and standard deviations from the 50 memory allocations requests at step 520. At step 522, the electronic device 100 verifies whether the calculated mean is one standard deviation greater than the previous mean. If the calculated mean is one standard deviation greater than the previous mean, the electronic device 100 allocates a new size to the fixed-size memory block for any subsequent memory allocation request at step 524. The size of the new fixed-size memory block is twice the calculated and stored standard deviation greater than the calculated and stored mean. Further, the value of count 1 is incremented by one, after which the electronic device 100 waits for a memory allocation request from the one or more applications stored at the electronic device 100. If the calculated mean is not greater than the previous mean by one standard deviation, the electronic device 100 retrieves the pre-allocated fixed-size memory block and increments the value of count 1 and count 2 by one at step 526. Thereafter, the electronic device 100 waits for subsequent, memory allocation requests from the one or more applications stored at the electronic device 100.

Various embodiments of the present invention provide a method and system for allocating memory to an electronic device. The method enables a prediction of the size of the static memory allocation packets, without using dynamic memory allocation technique. Further, the method ensures that the size of the static memory allocation packets changes when the application requesting memory allocation from the electronic device changes. Since the method for memory allocation uses the static memory allocation technique, the method is faster, as compared to the dynamic memory allocation technique.

It will be appreciated that the method and system for allocating memory to an electronic device described herein may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power-source circuits, and user-input devices. As such, these functions may be interpreted as steps of a method to enable users to view a broadcasted media stream differently. Alternatively, some or all of the functions can be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required, or essential features or elements of any or all the claims. The invention is defined solely by the appended claims, including any amendments made during the pendency of this application, and all equivalents of those claims as issued.

What is claimed is:

1. A method for allocating memory to an electronic device, the method comprising:
   providing a first static memory allocation to each allocation request of a first plurality of allocation requests;
   determining a mean and a standard deviation from the first plurality of allocation requests; and
   providing a second static memory allocation to each allocation request of a second plurality of allocation requests, wherein the second static memory allocation is based on at least two standard deviations greater than the mean.

2. The method as recited in claim 1, wherein the second static memory allocation is provided when the mean is at least one standard deviation greater than the first static memory allocation.

3. The method as recited in claim 1, wherein the second static memory allocation is based on a Gaussian distribution of memory allocation.

4. The method as recited in claim 1, further comprising allocating a static memory to one or more applications at the electronic device.

5. A method for allocating memory to an electronic device, the method comprising:
   providing a first static memory allocation to each allocation request of a first plurality of allocation requests;
   determining a mean and a standard deviation from the first plurality of allocation requests; and
   providing a second static memory allocation to each allocation request of a second plurality of allocation requests when the mean is at least one standard deviation greater than the first static memory allocation, wherein the second static memory allocation is based on at least two standard deviations greater than the mean.

6. The method as recited in claim 5, wherein the second static memory allocation is based on a Gaussian distribution of memory allocation.

7. The method as recited in claim 5, further comprising allocating a static memory to one or more applications at the electronic device.

8. An electronic device comprising:
   a memory module, wherein the memory module is capable of providing a first static memory allocation to each allocation request of a first plurality of allocation requests, wherein the first plurality of allocation requests is received at the electronic device; and
   a processor configured to:
      determine a mean and a standard deviation from the first plurality of allocation requests; and
      provide a second static memory allocation to each allocation request of a second plurality of allocation requests based on at least two standard deviations greater than the mean.

9. The electronic device as recited in claim 8, wherein the second, static memory allocation is based on a Gaussian distribution of memory allocation.

10. The electronic device as recited in claim 8, wherein the electronic device is at least one of the group comprising a mobile phone, a laptop, a Personal Digital Assistant (PDA), an automatic teller machine (ATM), a microwave oven, a programmable logic controller (PLC), a pager, an oscilloscope, a router and a wired phone.

11. The electronic device as recited in claim 8, wherein the second static memory allocation is provided when the mean is at least one standard deviation greater than the first static memory allocation.

12. The electronic device as recited in claim 8, further comprising a memory allocator for allocating static memory to one or more applications present at the electronic device.

* * * * *